United States Patent
Gahlert (10) Patent No.: US 10,259,519 B2
(45) Date of Patent: Apr. 16, 2019

(54) CONTROL SYSTEM FOR A VEHICLE, AND METHOD FOR CONTROLLING A VEHICLE

(71) Applicant: iCradle GmbH, Frankfurt (DE)

(72) Inventor: Andreas Gahlert, Königstein (DE)

(73) Assignee: COBI.bike GmbH, Frankfurt (DE)

( * ) Notice: Subject to any disclaimer, the term of this patent is extended or adjusted under 35 U.S.C. 154(b) by 134 days.

(21) Appl. No.: 15/121,900

(22) PCT Filed: Feb. 26, 2014

(86) PCT No.: PCT/EP2014/053729
§ 371 (c)(1),
(2) Date: Oct. 26, 2016

(87) PCT Pub. No.: WO2015/127967
PCT Pub. Date: Sep. 3, 2015

(65) Prior Publication Data
US 2017/0217525 A1    Aug. 3, 2017

(51) Int. Cl.
*B62J 99/00*     (2009.01)
*B62H 5/20*      (2006.01)
(Continued)

(52) U.S. Cl.
CPC .............. *B62J 99/00* (2013.01); *B62H 5/20* (2013.01); *B62M 6/45* (2013.01); *B62H 5/00* (2013.01);
(Continued)

(58) Field of Classification Search
CPC ................ B62J 99/00; B62J 2099/0033; B62J 2099/0026; B62J 2099/0006;
(Continued)

(56) References Cited

U.S. PATENT DOCUMENTS

2009/0181826 A1   7/2009   Turner
2011/0133542 A1   6/2011   Ratti et al.

FOREIGN PATENT DOCUMENTS

CN          102781768 A       11/2012
DE     10 2012 211719 A1      1/2014
(Continued)

OTHER PUBLICATIONS

European Patent Office, International Search Report for Application No. PCT/EP2014/053729, dated Dec. 11, 2014.
(Continued)

*Primary Examiner* — Brian P Sweeney
(74) *Attorney, Agent, or Firm* — Socal IP Law Group LLP; Nikki M. Dossman; Steven C. Sereboff (57) ABSTRACT

The invention relates to a control system for a vehicle and to a method for controlling a vehicle using such a control system. The control system has a mobile input and analyzing device, a holding device for the input and analyzing device, and means for actuating electronic components and for detecting state information of the vehicle. The aim of the invention is to maintain low production costs for the control system and to allow a wide use with different vehicles. This is achieved by analyzing the state information obtained by the means and by generating control signals for the electronic components in the mobile input and analyzing device.

23 Claims, 3 Drawing Sheets

(51) Int. Cl.
*B62M 6/45* (2010.01)
*B62H 5/00* (2006.01)

(52) U.S. Cl.
CPC .. *B62J 2099/002* (2013.01); *B62J 2099/0006* (2013.01); *B62J 2099/0026* (2013.01); *B62J 2099/0033* (2013.01)

(58) Field of Classification Search
CPC ........ B62J 2099/002; B62H 5/20; B62H 5/00; B62M 6/45
USPC ............................................................ 701/2
See application file for complete search history.

(56) References Cited

FOREIGN PATENT DOCUMENTS

| | | | | |
|---|---|---|---|---|
| DE | 102012211719 A1 | * | 1/2014 | ............. B62M 6/45 |
| EP | 2 565 110 A1 | | 3/2013 | |
| WO | 2015/127967 A1 | | 9/2015 | |

OTHER PUBLICATIONS

International Searching Authority, Translation of Written Opinion of the International Searching Authority for Application No. PCT/EP2014/053729, dated Dec. 11, 2014.

"Nyon Performance: The first all-in-one ebike cycle computer by Bosch," Oct. 4, 2013. Retrieved from the Internet: URL: https://web.archive.org/web/20131003160545/http://www.bosch-ebike.de/en/produkte_neu/nyon/nyon_portal_und_apps.php [retrieved on Oct. 21, 2014] the whole document.

* cited by examiner

CONTROL SYSTEM FOR A VEHICLE, AND METHOD FOR CONTROLLING A VEHICLE

The invention relates to a control system for a vehicle with the features of the preamble of claim 1 as well as a method for controlling a vehicle with such a control system.

Control systems in vehicles are being increasingly assumed by computer-supported solutions. Various pieces of information are obtained from the control system by sensors, evaluated and appropriate control signals for electronic components automatically produced therefrom. Furthermore, such control systems usually comprise an interface for the user, so that he or she may be informed about state information and, if necessary, access the control system. Besides the state information and control signals essential for the operation of the vehicle, the control systems of vehicles often encompass further functionalities, for example a satellite-supported navigation system or internet access.

Such control systems for vehicles serve as operation units and display devices as well as central controllers.

For highly priced vehicles, such as high-value motor vehicles or larger boats, the effort and costs associated with the implementation of such a control system is not significant in comparison to the costs overall.

However, there is also a desire for a central, networked control system for less expensive vehicles, such as a bicycle, an electric bike, a quadbike or a small motorboat, where all information converges and which with the aid of this information can send out control signals and make available an operational user-interface at the same time.

In cooperation with several producers of electric bicycles, Bosch GmbH provides a control system under the mark "Nyon" that is fixed to the electric bicycle and besides operational control, also offers other functions, such as satellite-supported navigation, smartphone tethering, or the attachment of chest straps for displaying the current heart rate. However, this control system is relatively inflexible due to the substantial integration into the respective electric bicycle, which significantly increases production efforts and thereby the costs.

The task of the invention is to provide a control system for a vehicle and a method for controlling a vehicle, which may be utilized with different vehicles with relatively little effort and low costs. In particular, multiple use of the control system with various vehicles should be possible.

For a control system for a vehicle that has a mobile input and analyzing device, a holding device for the input and analyzing device, and means for actuating electronic components and for detecting state information of the vehicle, the invention provides that analysis of the state information received from the means as well as the generation of control signals for the electronic components occurs in the mobile input and analyzing device. The means may encompass, for example, sensors, switches, driver components, cameras, servo-motors and the like and enable, for example, reading vehicle and/or driver/rider data. According to the invention, the computing power available in the mobile input and analyzing device is exploited and used for the control of electronic components fixed to the vehicle. The mobile input and analyzing device serves thereby as a superordinate control, which can be used with different vehicles. In particular, it is useable as an accessory for many vehicles. Therefore, through the use of the inventive control system it is not necessary to equip each vehicle with its own control system. Rather, the most costly and complicated part, namely the mobile input and analyzing device that provides the necessary computing and storage capacity as well as a user-interface, can be used with different vehicles. This has the additional advantage that user-specific settings are directly available in the respective vehicle used by taking the mobile input and analyzing device. Through this, the application of the mobile input and analyzing device for analyzing the state information and for generating control signals enables use of the control system in lower-cost vehicles too, since the effort required for implementation is kept low. In particular, it is not necessary to fix an suitable control device to the respective vehicle. Rather, their task is assumed by the mobile input and analyzing device. In this way, all or selected state information may be displayed by the mobile input and analyzing device. The mobile input and analyzing device services therefore as a so-called on-board computer or bicycle computer, which displays information about the current speed of the vehicle, the travel time, the average speed, the energy usage, ascended altitude and the like. Additional display elements may therefore be dispensed with.

In a particularly preferred design the vehicle is an electrovehicle, in particular an electrobike, which comprises an electric drive system, whereby state information is transferable from the electric drive system to the mobile input and analyzing device and control signals from the mobile input and analyzing device are transferable to the drive system. In particular in the field of electrovehicles, and especially for electrobikes, the cost pressure due to conventionally powered bicycles (i.e. bicycles powered by the user's muscles) is very high. In addition, electrovehicles offer possibilities for the user to influence the vehicle, whereby particular state information, e.g. a remaining distance, a battery capacity or applied or available torque, may be particularly interesting for the user. This state information can be provided to the user via the input and analyzing device. Furthermore, the input and analyzing device can, as a superordinate control, assume control of the drive system, which may be user-specific, whereby it is possible, at least partly, to take state information originating from the vehicle automatically into account. It is also possible, by use of the inventive control system, to equip lower-cost vehicles, such as electrobikes, with a comfortable and highly functional control system without significant effort or cost. A supply of energy by the energy storage device of the electrovehicle and/or electrobike may be provided at least according to need, in order to avoid a limitation of range due to insufficient battery capacity of the mobile input and analyzing device.

Preferably, the mobile input and analyzing device comprises a smartphone. Smartphones are offered as mobile telephones by different producers, for example under the mark "iPhone" from the company Apple or under the mark "Galaxy" from the company Samsung. These smartphones comprise a user surface as a touch-sensitive display, which enables the entry of data by the user. Furthermore, state information may be displayed on the display. In addition, smartphones are capable of a variety of functions, including telephone capabilities, a storage medium for data, in particular for the reproduction and capture of images, films and music, GPS navigation, mobile internet use, wireless connection technologies such as WLAN and Bluetooth and many more. As such, smartphones are typically equipped with efficient processors and sufficiently high storage capacity, so that the additional control tasks of a control system may be assumed sufficiently quickly and without issue. Through the use of a smartphone, which a large part of the target user-base already possesses, the additional costs associated with equipping a vehicle with the inventive control system may be kept very low. The most costly part of the control system, namely the computing unit with the necessary storage elements and a display and operating surface, is provided by the mobile device, namely the smartphone. Electronic devices that do not comprise a telephone function are still considered in the same sense as a smartphone, such as tablet PCs and the like, for example.

In a particularly preferred design, at least one sending and receiving element is arranged in the holding device, with which the mobile input and analyzing device is connectable, in particular wirelessly. In this way, the holding device serves as a central unit with its own controller, which controls the communication between the mobile input and analyzing device and the means (i.e. components). Through provision of a wireless connection, the control system is therefore essentially manufacturer-independent, since no corresponding connectors must be provided in the input and analyzing device. In particular, when using a smartphone as the mobile input and analyzing device, the functions necessary for a wireless connection, such as a WLAN or Bluetooth Module, are generally already integrated. Therefore, engagement of the mobile and analyzing device can take place without issue, since it only needs to communicate with the sending and receiving element arranged in the holding device, and does not establish its own connection to the means (i.e. components) of the vehicle. The effort for implementation of the device is thereby kept low.

Preferably, the control system comprises means for collecting and in particular wirelessly transferred biometric data of the driver to the mobile input and analyzing device, which comprises a function for presenting and analyzing the biometric data, whereby control signals may be automatically generated from the mobile input and analyzing device based on the analysis. Hence, not only is purely vehicle-related information processed and possibly displayed in the input and analyzing device, but rather also user-specific information. For example, a chest-strap used for the measurement of the heart rate may be wirelessly connected with the input and analyzing device, so that the current heart rate is displayed. If the measured heart rate is then over a set threshold, for example, the mobile input and analyzing device may increase support of forward movement of an electrobike through appropriate actuation of the drive system, so that the load experienced by the user is less. Further applications, for example blood pressure monitoring, fatigue recognition and the like are also conceivable.

Preferably the sending and receiving element is wirelessly connectable with the means, whereby the sending and receiving element is suitable for wireless communication through standardized methods in particular. The sending and receiving element, which manages communication between the means and the mobile input and analyzing device, can therefore communicate wirelessly not only with the mobile input and analyzing device, but also with the means of the vehicle. Efforts associated with wiring the vehicle are therefore minimized. Thereby, placement of the sending and receiving element on the vehicle is subject only to minimal restrictions, since no time- and effort-intensive arrangement of wiring is necessary. The effort associated with implementing the control system is thereby correspondingly low. Standardized methods for wireless transfer may be WLAN, Bluetooth, 3&4, Zigbee and similar industry standards, whereby it is particularly advantageous when all standards for wireless communication are supported, in order to offer maximal compatibility and futureproofing.

Preferably, the control system comprises means for satellite-supported positioning, which are arranged in particular in the holding device. These means may be associated in particular with the sending and receiving element. The satellite-supported positioning can then be used in connection with map data for satellite-supported navigation, for example.

However, particularly preferred is that an anti-theft device is arranged in the holding device, which comprises in particular a position tracker. In this way, the satellite-supported positioning is made use of and, upon e.g. an unintended change in the position, a corresponding message sent via a GSM module accommodated in the holding device to the mobile input and analyzing device, if this is not coupled with the holding device. The anti-theft device can also comprise further elements, for example an acceleration sensor and/or an acoustic alarm.

Preferably, the mobile input and analyzing device comprises a map display, whereby in particular satellite navigation is included. In this way, the mobile input and analyzing device, besides the capabilities necessary for the control of the drive system of the vehicle, also offers all functions for automatic satellite-supported navigation. This is easily possible with typical smartphones, since the storage capacity as well as the computing performance is sufficiently high and a GPS module and wireless communications technology are typically already integrated. Through this, the number of devices necessary for providing all functionalities are minimized.

Preferably, the electronic components comprise a component for controlling the motor, an electronic circuit arrangement, an actuator for influencing a suspension stiffness and/or chassis characteristics, an actuator for modifying a saddle height and/or a light controller. Through this, it is already possible to extensively influence the drive characteristics of land-bound vehicles. For example, the chassis is adjusted via two servo-motors, whereby an actuation can in principle occur automatically through the input and analyzing device, which for example knows based on map data or measured values whether the rider is travelling up- or downhill, or what quality of road surface is present. With water-vehicles, there is also the possibility of an automatic control—i.e. autopilot. For this, an electronic component is necessary, which can influence the direction of travel—for example, an actuator for adjusting the rudder angle. The control system may also comprise further electronic components not detailed here if necessary.

The means preferably encompass a rotational frequency sensor, a speed sensor, a pedal frequency sensor, an air pressure sensor, a (battery) capacity sensor and/or a sensor for measurement of the output power. In this way, varying state information may be retrieved, so that essentially automatic control is possible. In addition, a large amount of information may be supplied to the user. Depending on requirements, still further means can be provided, for example an altitude sensor or a temperature sensor. Additional means may be in the form of driver modules, serving to actuate the electric components. If the means communicate initially with the sending and receiving element and the signals are transmitted from there firstly to the mobile input and analyzing device, then the tethering of many means does not constitute a particularly heavy load for the input and analyzing device. Rather, addressing these means and if necessary also the electronic components occurs preferably only in the sending and receiving element, so that implementation in the input and analyzing device can be carried out purely by means of software. In this way, the effort for implementation is minimized and the variability regarding the utilizable input and analyzing device is high. For this, smartphones with any desired operating system may be used, for example.

In a preferred further development, an electric energy storage system is arranged in the holding device, in particular for supplying energy to the mobile input and analyzing device held in the holding device. In this manner, the electric energy storage system also serves to supply energy to the sending and receiving element, so that the holding device may be freely mounted without having to be connected via wires to any components of the vehicle. The holding device can thereby be mounted on moveable parts without any problem, for example a set of handlebars. Thus, it is possible to accommodate the mobile input and analyzing device in the holding device in an easily accessible and visible area. The electric energy storage system can furthermore be used for supplying energy to the mobile input and analyzing device. The often encountered disadvantage that the capacity of the batteries used in the mobile input and analyzing device—in particular in smartphones—is very limited, is thereby addressed. With help of the electric energy storage system within the holding device, however, acceptable operating times can still be achieved. For example, in this way operation may be maintained for over eight hours.

Preferably the mobile input and analyzing device comprises a function for calculating a remaining range. This is particularly helpful for vehicles with an electric drive, such as electrobikes, since charging the electric energy storage system serving to power the electric drive is not easily possible everywhere and furthermore requires a relatively long time. Other functions may be provided to extend the range, such as a restriction of the maximum available power, for example. It can be further provided that storage map data is accessed, in particular topographical data of the present route, in order to achieve a more exact range calculation.

Preferably, the control system comprises a remote operational module that in particular is wireless connectable with the mobile input and analyzing device. Via such a remote operational module the mobile input and analyzing device can be operated without needing to be physically touched. The remote operational module corresponds thereby to a multi-functional control, as for example known from motor vehicle steering wheels. Here it is possible for example to provide the remote operational module with tactile buttons in order to enable operation when wearing gloves. This is particularly advantageous when using a smartphone as the input and analyzing device, which typically is equipped with a touch-sensitive display that does not permit operation with gloves. Further, the remote operational module can be attached in such a way that the steering device of the vehicle, in particular an electrobike, does not need to be let go of in order to operate the module. This is possible in particular when the remote operational module may be operated with the thumbs, and can be attached next to the handle grips typically present on the handlebars.

According to a method for controlling a vehicle, in particular an electrovehicle with a control system according to one of the claims 1 to 14, the invention comprises detecting state information via means attached to the vehicle and transferring this to a mobile input and analyzing device, whereby the state information is analyzed and control signals for controlling electronic components of the vehicle are generated in the mobile input and analyzing device. For analyzing the state information as well as generating the control signals, a control unit fixed to the vehicle is not employed, but rather a mobile input and analyzing device that can comprise further functionalities. In particular, the mobile input and analyzing device can be implemented for controlling different vehicles, whereby it is coupled by the user with the respectively used vehicle. It is thus not necessary for each vehicle to have an integrated, individual, stationary and complete control system. Rather, a decentralized solution is possible. The production effort of the vehicle is hereby reduced and through the use of a mobile input and analyzing device that will usually be present regardless, a cost-effective solution for controlling the electronic components of the vehicle is made available.

Here it is particularly preferred that a smartphone is utilized as mobile input and analyzing device. A smartphone is frequently present regardless and predestined for mobile implementation. Typically, it comprises sufficient computing power and storage capacity in order to execute additional programs that are necessary for the control of the electronic components of the vehicle. Through use of the smartphone, along with the computing power and user interface—such as a touch-sensitive display—made available thereby, the effort and therefore costs for the remaining control system are kept low.

Here it is particularly preferred that control signals for an electric drive system of the vehicle are generated from the mobile input and analyzing device, whereby state information is provided to the mobile input and analyzing device from the electric drive system. The mobile input and analyzing device is therefore used not only for displaying state information obtained via various sensors, but also for generating control signals for the electric drive system of the vehicle. Further control signals can be generated for example for STELLMOTOREN, switches, cameras, sensors and the like. An extra controller fixed to the vehicle can hence be completely done away with if necessary, or instead be furnished with less performance capacity to make it correspondingly less expensive.

In a preferred embodiment, the signals are transferred wirelessly between the mobile input and analyzing device and a sending and receiving element, which is arranged in a holding device for the mobile input and analyzing device, whereby the signals are transferred between the sending and receiving element and the means in particular wirelessly. Through the use of standardized protocols for the wireless transfer, a number of mobile input and analyzing devices may communicate with the sending and receiving element, independent of their manufacturer and without it being necessary to create a corresponding wired interface, which generally must be tailored to the device in question. Through this, a great variability os obtained. The sending and receiving element converts the signals generated by the input and analyzing device to corresponding signals that may be utilized by the means. The same applies mutatis mutandis to the information received from the means, which is converted into corresponding signals for the input and analyzing device. Address of the means occurs therefore in the sending and receiving element, so that implementation of the mobile input and analyzing device is simple. Wireless transfer of the signals between the sending and receiving element enables easy removal or addition of further means and functionalities. In addition, the costly and time-consuming arrangement and attachment of wires and cables can be dispensed with, so that the sending and receiving element, i.e. the holding device for the input and analyzing device, may be positioned freely.

Preferably, the computing power available in the input and analyzing device is used for at least the majority of the computing performance necessary for control of the vehicle, in particular of the electric drive system. Such computing power is regardless available from typical smartphones. In this way, the rest of the control system can be designed and built simply and cost-effectively.

Preferably, open-source software is used for realizing the functions in the mobile input and analyzing device. Through this, the functionalities of the control system can be expanded relatively simply and amended based on changing requirements. Furthermore, the costs for the control system are reduced in this way.

Advantageously, control signals are generated automatically in the input and analyzing device based upon the state information received from the means, said signals controlling in particular suspension stiffness, a responsive characteristic of the electric drive system and/or a performance output of the electric drive. The mobile input and analyzing drive can thereby have a relatively strong influence on the driving characteristics of the vehicle. Through automatic generation of the control signals, greater comfort is thereby attained. The extent of the control can be such, that the generated data can be used for different assistive purposes or also for gamification, for example for exchanging data between "befriended" systems.

The invention is described in more detail in the following, in conjunction with preferred example embodiments and the drawings. These show.

Figure 1:
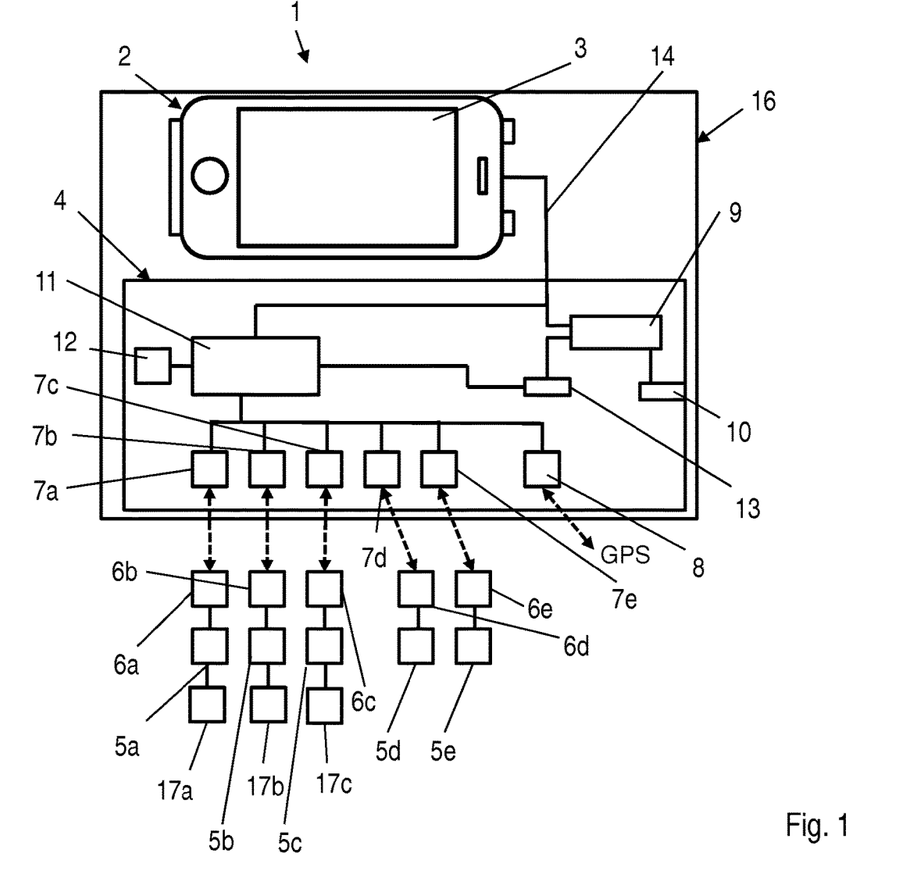
FIG. 1 a schematic depiction of a first embodiment of the control system.

In FIG. 1, a control system 1 according to the invention, for a land or water vehicle, in particular for an electrically driven vehicle, such as an electrobike, is schematically shown. The control system 1 comprises as essential components a mobile input and analyzing device 2, that provides the necessary computing power for the operation of the control system 1 and additionally, a user interface. The input and analyzing device 2 is construed as a smart phone, for example an iPhone or Samsung Galaxy phone, and comprises therefore a touch-sensitive display for displaying information as well as providing a user interface, via which the user can cause an input. A sending and receiving element 4 serves to transfer signal information between the input and analyzing device 2 and means 5a to 5e, which comprises communication means 6a to 6e, in order to be able to communicate wireless with the sending and receiving element 4. With assistance of the means 5a-5c, electronic components 17-17c, such as switches, an electric drive system, servomotors, a camera and the like, for example, may be actuated. The means 5a-5c with the associated communication means 6a-6c enable communication over a wireless standard, for example Zigbee, Bluetooth, WLAN or the like. The sending and receiving element 4 comprises communication elements 7a to 7e corresponding hereto.

Despite the fact that the number of the communication elements 7a to 7e matches the number of the means 5a to 5e in the schematic construction shown here, this is not necessary. Rather, a single communications element can be connected with several means. The large number of communication elements 7a to 7e serves only to illustrate various applicable transmission standards, which do not all necessarily have to be integrated in the sending and receiving element 4.

The sending and receiving element 4 is accommodated in a holding device 16, which comprises a positive-fit accommodation of the mobile input and analyzing device. Upon operation of the vehicle, the mobile input and analyzing device can be held in the holding device in a secure manner.

Further, the sending and receiving element 4 comprises a means 8 for satellite-supported positioning, in particular a GPC/GSM module. In addition, an electric energy storage system 9, formed as a battery for example, a camera 10, a control 11 as well as a control component 12 are provided. If needed, an energy supply can be switched on and off via a switch 13 between the electric energy storage system 9 and the controller 11. In this way, the control system 1 can be operated, or disabled when not in use.

Between the sending and receiving element 4 and the mobile input and analyzing device 2, a wired communication is provided according to this embodiment. For this, a wire 14 with appropriate connectors is inserted into a connection socket of the input and analyzing device 2. Via this wire 14, a supply of electrical energy from the electric energy storage system 9 can occur, as well as transfer of control signals and state information between the input and analyzing device 2 and the sending and receiving element 4 (or the controller 11). The controller 11 then implements the received control signals into appropriate signals for the means 5a to 5c, which then serve as driver stages. In return?, the controller 11 converts the signals received from the means 5d and 5e into corresponding data that may be utilized by the input and analyzing device 2. The sending and receiving element 4 integrated in the holding device for the mobile input and analyzing device 2 acts as a central unit, which serves for communication between the mobile input and analyzing device 2 and the means 5a to 5e (i.e. the components 17a to 17c) of the vehicle. In this way, the computing power of the mobile input and analyzing device 2 is used for the important control tasks, in particular the generation of the control signals.

Figure 2:
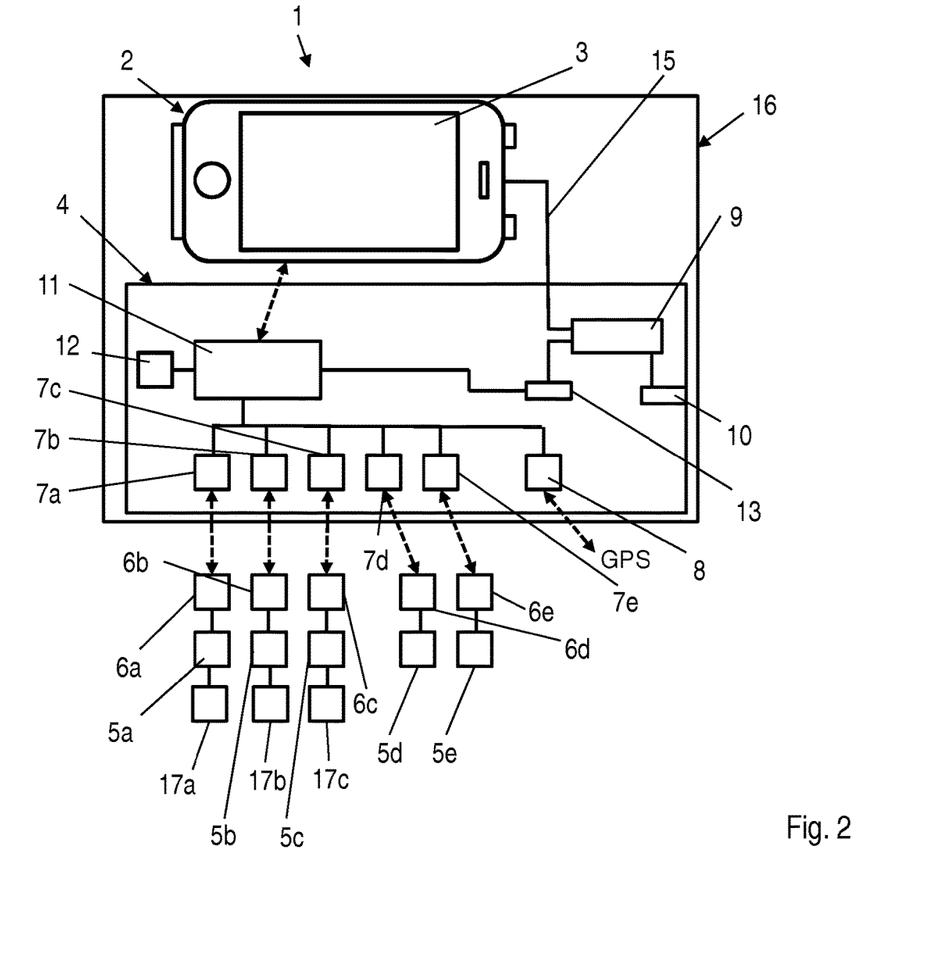
FIG. 2 a schematic depiction of a second embodiment of the control system.

FIG. 2 shows the schematic construction of a further embodiment of the inventive control system 1, which is distinguished from the construction shown in FIG. 1 essentially in that the mobile input and analyzing device 2 communicates wirelessly with the sending and receiving element 4. In addition, a wired energy supply is provided via a supply line 15. Wireless communication between the sending and receiving element 4 as well as the input and analyzing device 2 then preferably also occurs via typical industry standards, for example WLAN or Bluetooth. Through this, a communication (i.e. control) is already possible when the mobile input and analyzing device 2 is not yet accommodated in the holding device 16. Furthermore, manufacturer-independent usage of the input and analyzing device 2 is possible, since these only need to offer a standardized wireless transfer, whereas however no regard needs to be taken of special connectors or connector ports.

Figure 3:
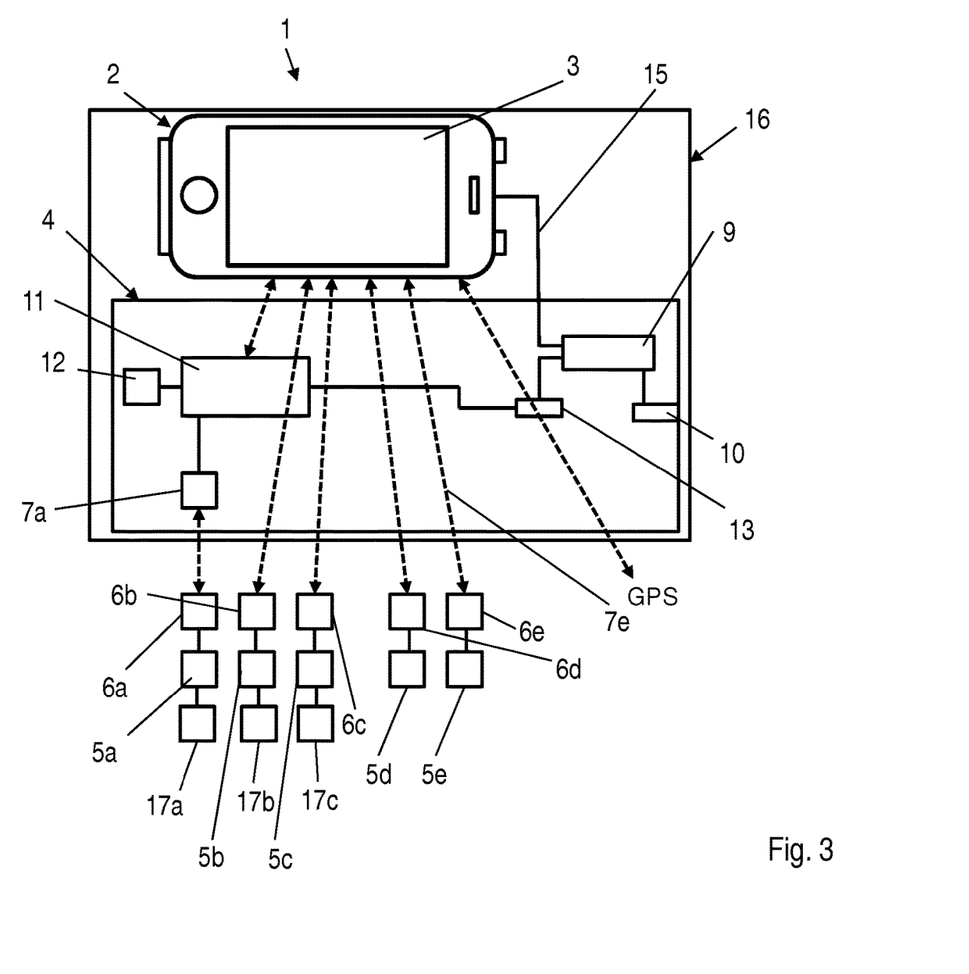
FIG. 3 a schematic depiction of a third embodiment of the control system.

In FIG. 3, a further simplified construction of a control system 1 is illustrated, for which the mobile input and analyzing device 2 partly directly and wireless communicates with the means 5b to 5d and the corresponding components 17b and 17c. Additionally, a wireless communication occurs between the input and analyzing device 2 and the sending and receiving element 4 and from there, with the means 6a and the component 5a. The sending and receiving element 4 comprises furthermore no means for satellite-supported positioning. Rather, the GPS module present in the input and analyzing device is used for positioning. This is available from typical smartphones regardless.

The invention is not restricted to one of the previously described embodiments. Rather, it is variable in various ways. Different standards for wireless communication can be provided. It is also conceivable to connect the sending and receiving element 4 in a wired manner with the means 6a to 6e, i.e. the components 17a to 17c. Further, the number of the means and components may be chosen relatively freely, depending on the requirements.

The inventive control system for a vehicle, in particular for a vehicle with an electric drive system, such as an electrobike, offers a cost-effective solution, which may be realized without difficulty or particular effort. Input and analyzing devices that would be available regardless, such as smartphones or tablet PCs, are used as essential components, which make available the necessary computing power for control in particular. The part of the control system that is to be fixed to the respectively used vehicle, in particular the sending and receiving element as well as the means and electronic components, are partly present regardless, but partly also easily installable. In this way, a cost-effective networking solution of all electronic components with novel operational and display concepts is achieved via the mobile input and analyzing device, in particular a smartphone. State information can be collected and evaluated by the input and analyzing device from the driver as well as from the vehicle and the environment.

The mobile input and analyzing device integrates many functions within itself, for example the function of a bicycle computer in the case of a electrobike, a telephone, a music player, a light control, a trigger for switching gears, setting a suspension characteristic, setting a saddle height and more. Through additional software, expansion is readily possible.

The inventive control system constitutes thereby a wireless, networked control of vehicle systems based upon mobile input and analyzing devices, such as smartphones. In this way, the control system can attain very cost-favorable, simply manufacturing, in that it offloads the most expensive element, that of the processing power providing computer, into a device which is typically available regardless, such as a smartphone. Here, vehicle and rider data are detected via corresponding means, such as sensors, and analyzed in the mobile input and analyzing device for the purposes of automatic and intelligent control through use of software. Additionally, a satellite-supported anti-theft protection can be provided as well as an additional energy supply, in order to extend the lifetime of the mobile input and analyzing device. Furthermore, control of the electric drive system can also optionally occur via the mobile input and analyzing device. The elements of the control to be installed fixed to the respective vehicle can thereby be produced relatively cost-effectively. In particular, it can be possible to control individual components, such as motors, sensors, switches, cameras and drives.

All features and advantages arising from the claims, description and figures, including constructional details, spatial arrangements and method steps can form an essential part of the invention both alone and in various combinations.

REFERENCE LIST

1 Control system
2 Input and analyzing device
3 Display
4 Sending and receiving element
5a-5e Means
6a-6e Communication means
7a-7e Communication elements
8 Means for satellite-supported communication
9 Electric energy storage system
10 Camera
11 Controller
12 Control components
13 Switch
14 Wire
15 Supply line
16 Holding device
17a-17c Electronic components

The invention claimed is:

1. A holding device for a mobile input and analyzing device, wherein the mobile input and analyzing device is used for the control of electronic components of a vehicle which are fixed to said vehicle, wherein at least one sending and receiving element is arranged in the holding device, with which the mobile input and analyzing device is connectable, and wherein the sending and receiving element comprises communication elements, wirelessly connectable with means for actuating electronic components and means for detecting state information of the vehicle.

2. Control system for a vehicle with the holding device for the mobile input and analyzing device according to claim 1, which comprises the mobile input and analyzing device, the holding device for the input and analyzing device as well as means for actuating electronic components and means for detecting state information of the vehicle, characterized in that an analysis of the state information received from the means for detecting state information as well as the generation of control signals for the electronic components occurs in the mobile input and analyzing device.

3. Control system according to claim 2, characterized in that the vehicle is an electrovehicle, which comprises an electric drive system, whereby state information is transferable from the electric drive system to the mobile input and analyzing device and control signals from the mobile input and analyzing device are transferable to the drive system.

4. Control system according to claim 2, characterized in that the mobile input and analyzing device is a smartphone.

5. Control system according to claim 2, characterized in that the control system comprises means for detecting and transferring biometric data of the driver to the mobile input and analyzing device, which comprises a function for presenting and analyzing the biometric data, whereby control signals for the drive system are automatically generated from the mobile input and analyzing device based on the analysis.

6. Control system according to claim 2, characterized in that the electronic components encompass: a motor control, a gear shift, an actuator for influencing a suspension stiffness, an actuator for modifying a saddle height or a light control.

7. Control system according to claim 2, characterized in that the means for detecting state information encompasses: a rotational frequency sensor, a speed sensor, a pedal frequency sensor, an air pressure sensor, a sensor for detecting a charge capacity or a sensor for detecting an output performance.

8. Control system according to claim 2, characterized in that an electric energy storage system is arranged in the holding device for supplying energy to the mobile input and analyzing device held in the holding device.

9. Control system according to claim 2, characterized in that the mobile input and analyzing device comprises a function for calculating a remaining range.

10. Control system according to claim 2, characterized in that the control system comprises a remote operational module, which is connectable with the mobile input and analyzing device.

11. The holding device of claim 1, characterized in that the wireless communication between the sending and receiving element and the means for detecting state information is established through standardized methods.

12. The holding device of claim 1, characterized in that the holding device comprises means for satellite-supported positioning.

13. The holding device of claim 1, characterized in that an anti-theft device is arranged in the holding device, which comprises a position tracker.

14. The holding device of claim 1, characterized in that an electric energy storage system is arranged in the holding device for supplying energy to the mobile input and analyzing device held in the holding device.

15. The holding device of claim 14, characterized in that the sending and receiving element comprises a controller for implementing control signals for the means for detecting state information, the control signals being received by the input and analyzing device, and a switch, wherein energy supply between the electric energy storage system and the controller can be switched on.

16. The holding device of claim 15, characterized in that the controller converts the control signals received from the means for detecting state information into corresponding data that can be utilized by the input and analyzing device.

17. The holding device of claim 1, characterized in that the sending and receiving element comprises a camera.

18. Method for controlling a vehicle with a control system, wherein the control system comprises a holding device for a mobile input and analyzing device, wherein the mobile input and analyzing device is used for control of electronic components of the vehicle which are fixed to the vehicle, wherein at least one sending and receiving element is arranged in the holding device with which the mobile input and analyzing device is connectable, and wherein the sending and receiving element comprises communication elements wirelessly connectable with means for actuating electronic components and means for detecting state information of the vehicle, whereby state information is detected via means attached to the vehicle and transferred to the mobile input and analyzing device, and whereby the state information is analyzed and control signals for controlling electronic components of the vehicle are generated in the mobile input and analyzing device.

19. Method according to claim 18, characterized in that a smart phone is used as the mobile input and analyzing device.

20. Method according to claim 18, characterized in that control signals for an electric drive system of the vehicle are generated from the mobile input and analyzing device, whereby state information is provided to the mobile input and analyzing device from the electric drive system.

21. Method according to claim 18, characterized in that the signals are transferred wirelessly between the mobile input and analyzing device and the sending and receiving element, which is arranged in a holding device for the mobile input and analyzing device.

22. Method according to claim 18, characterized in that the computing power available in the input and analyzing device is used at least for the majority of the computing performance necessary for control of the vehicle.

23. Method according to claim 18, characterized in that open source software is used for realizing the functions in the mobile input and analyzing device.

* * * * *